April 2, 1968  A. PERANIO  3,376,501
CELL FOR DETERMINING THE CONDUCTIVITY OF LIQUIDS
ENTRAINED IN POROUS MEDIA
Filed Dec. 9, 1966

INVENTOR.
ANTHONY PERANIO

Bierman + Bierman
ATTORNEYS

United States Patent Office 3,376,501
Patented Apr. 2, 1968

3,376,501
CELL FOR DETERMINING THE CONDUCTIVITY OF LIQUIDS ENTRAINED IN POROUS MEDIA
Anthony Peranio, Haifa, Israel, assignor to Varian Associates, Palo Alto, Calif., a corporation of California
Continuation-in-part of application Ser. No. 556,593, June 10, 1966. This application Dec. 9, 1966, Ser. No. 600,581
4 Claims. (Cl. 324—30)

ABSTRACT OF THE DISCLOSURE

A cell for determining conductivity of liquids comprising a casing having a block of resinous material therein, a cable extending into the casing and block, at least one pair of electrodes embedded in the block having its surface exposed at a face of the block, wires connecting with the electrodes in the block, hollow space between the face and the opposite wall of the casing, a plurality of openings in the casing to allow liquid to enter the hollow space. The electrodes are spaced from the surrounding materials a distance about equal to or greater than the distance between the electrodes themselves.

---

The present application is a continuation-in-part of application Serial No. 556,593, filed June 10, 1966, and entitled "Conductivity Cell," which in turn is a continuation-in-part of application Serial No. 188,786, filed Apr. 10, 1962, and entitled "Cell for Measuring Electrical Conductivities of Liquids," both now abandoned.

This invention relates to a device for determining the electrical conductivity of liquids entrained in soils. It has particular application for measuring electrical conductivity of liquids in saturated porous media; for example, determining the salinity of underground water in sand.

A technique for measuring the salinity or electrical conductivity of underground water necessitates the boring of an observation well to the level at which water salinity is to be determined. A standard conductivity cell is lowered into this well to the proper level, with electrical connections to a bridge circuit (which is the usual case) and from the earth's surface a determination of water salinity is made. In another technique, an evacuated ampule is lowered to the desired depth and from up above it is broken open. Water rushes in and fills the ampule. The ampule is then raised to the surface and a salinity determination is made, using conventional instrumentation. Both these techniques are based upon the construction of a suitable observation well. In addition, an uncertainty exists as to whether or not the water existing in the observation well pipe is really representative of the water outside the pipe at that same depth or level. Finally, both techniques are time consuming since they require lowering and raising either a conductivity cell or an ampule to and from a considerable depth at each observation well.

In the present invention, a specially constructed cell is lowered into a drilled hole to the depth at which a determination is to be made. An electrical cable is connected to it from the surface. The hole is then filled in, and just a terminal strip is left exposed. In this way, no observation well with a special screen is necessary. In addition, the cell samples water in the porous medium at a certain depth. Finally, salinity or conductivity can be checked quickly using a portable instrument that can be taken into the field.

In its specific embodiment, the cell is constructed of several basic elements; a casing made of electrically non-conducting material, a screen inside part of the casing, electrodes and connecting wires, and a cable or cables from outside the casing, passing through it and connected to the electrodes. The casing consists of a hollow, relatively thin-walled tubular portion provided with disks to close off its end openings. Internally, the casing is divided into two semi-cylindrical portions, one of which has a plurality of openings in its side, and ends to allow free access of water or other fluid. The other portion holds four electrodes and wire connections therefrom to the top of the casing where a cable enclosing the wires leads to measuring instruments. A solid block of electrically insulating material fills the second portion embedding the electrodes and the wiring. One surface of each of the electrodes is in the face plane of the block and comes in contact with any fluid flowing into the space of the first portion. A screen covers the openings in the casing to prevent ingress of solid matter.

The invention is more fully described in connection with the accompanying drawing, in which like reference characters indicate like parts and in which.

Figure 1:
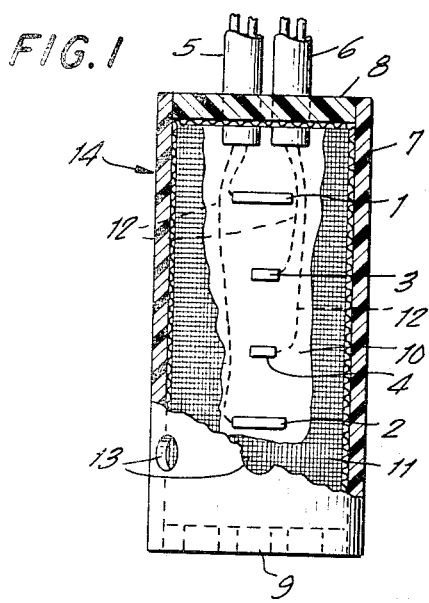
FIG. 1 is a vertical cross-sectional view of a cell constructed in accordance with the present invention, some parts being shown in elevation.

Shown in FIG. 1 is a pair of current-carrying electrodes 1 and 2, and potential measuring electrodes 3 and 4. These electrodes are made of a noble metal, preferably platinum, so that even though they are buried underground, or are used in some other corrosive atmosphere, they do not change significantly in electrical characteristics; especially in resistivity. Cables 5 and 6 are two-conductor cables with electrical screens or insulation whose outside shield is made of vinyl or other plastic material of long-term stability suitable for installation underground. Cable 5 is connected to the current electrodes, and cable 6 is connected to the potential electrodes. The entire electrode assembly is cast, connections and all, in an epoxy resin, or polyester resin block 10 of semi-cylindrical shape to fit inside tube 7. Cables 5 and 6 are embedded directly into the block 10 along with all connecting wires 12 and the platinum electrodes. Just the faces of the electrodes are left exposed (the faces showing in FIG. 1). These faces are preferably in alignment with one another as shown in FIG. 1. All other parts of the electrodes and all connecting wires are effectively sealed off and insulated by the cast resinblock material.

The electrode assembly of semi-cylindrical shape is glued into a relatively thin-walled tube or pipe 7 of matching radius. Tube 7 is constructed of material which is substantially electrically non-conducting, and has sufficient strength to withstand pressure exerted by the soil in which the cell is to be buried. Suitable materials for this purpose were found to be polyester resin, polyester resin reinforced with glass fibers, and epoxy resin. A large number of possible materials in the class of synthetic resins that polymerize, with or without filler, can be used for this application, and these materials are well-known to those versed in the plastics art.

Another manufacturing technique is to cast the electrodes in a single unit of epoxy resin to the desired shape of both the tubular portion of tube 7 and the block 10. Tube 7 is provided with a series of relatively large holes 13 that permit water or other liquid to flow freely into and out of its inner space. Tube 7 is further provided with disk-like end covers 8 and 9, provided with holes which connect to the tube's inner space. Since the cell of the invention may be used in relatively fine porous material (such as sand), a method has also been provided for preventing the intrusion of sand or other earth particles into the hollow inside portion of cylindrical casing 14, which casing is made up of tube 7 and end disks 8 and 9. A fine mesh screen 11 is provided all around the hollow inside of casing 14 except over the face of the electrodes 1, 2, 3, and 4. The screen acts to prevent solid particles from entering the cell, but permits the free flow of liquid through the cell. The fine mesh screen used in this embodiment of this invention was made of polyethylene strands. However, it could be made of any suitable plastic materials. It is important that the screen material be chemically stable, and be a good electrical insulator.

The invention is seen to consist, therefore, of a thin-walled hollow casing made of electrically non-conducting material having relatively large openings that are screened against the intrusion of all but extremely small particles of earth or sand. Inside this casing is placed a set of four chemically stable electrodes fixed into an insulating block so that just a single surface of each electrode faces into the hollow enclosure. Passing through the wall of the casing, and connected to the electrodes, are insulated wires for making connections during conductivity measurements.

If it is desired to keep track of the salinity of water in an aquifer at a certain location at a depth of one-hundred feet below the surface, this invention may be used as follows: A hole is drilled large enough to take the cell of this invention. The cell is lowered into the hole until it reaches the desired level by means of its connecting cables. The hole is filled in. Water at the depth of one-hundred feet enters the cell. At the surface, conductivity measuring apparatus of the four-electrode type is connected to the cell's cables. Readings are obtained, and these are compared with the results of previous calibration of the cell in the laboratory. By comparing these readings, the salinity of the water at the one-hundred foot depth can be determined. This type of measurement is well-known in the art of conductivity measurements and will not be described here.

Figure 2:
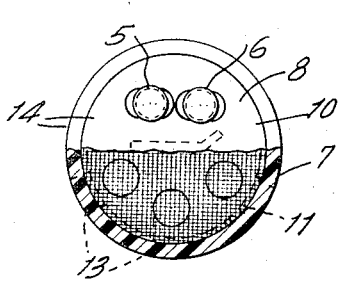
FIG. 2 is a top plan view thereof.
Figure 3:
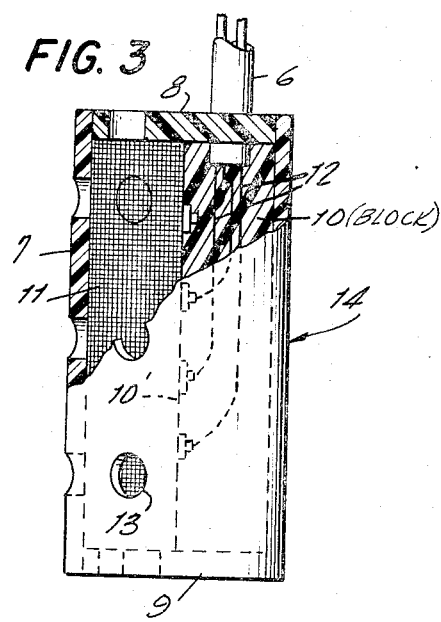
FIG. 3 is a vertical cross-sectional view taken at right angles to that of FIG. 1.
Figure 4:
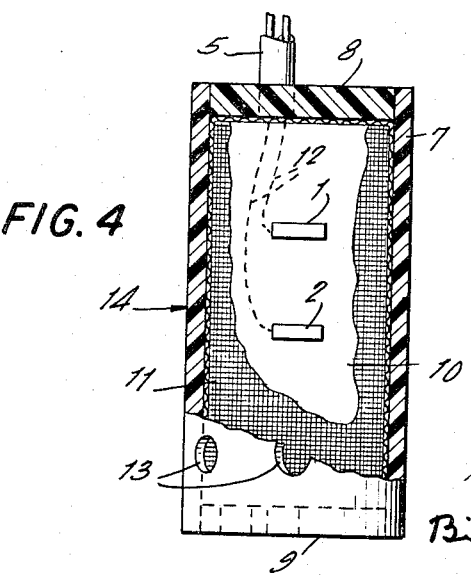
FIG. 4 is a vertical cross-sectional view of another embodiment of the cell in which some parts are shown in elevation.

The conductivity cell of FIG. 4 is identical in all respects with that shown in FIGS. 1, 2, and 3, except that two electrodes are used instead of four. This alternative embodiment has the disadvantage that accuracy of measurement is dependent upon the long term stability of its two electrodes. Any changes in their resistivity from the original calibration will introduce error into the determination. The first conductivity cell described is relatively free from this effect; that is, using four electrodes instead of two. Finally, the conductivity cell according to this invention has been designed so as to be virtually insensitive to the effect of any surrounding non-conducting medium.

It is known that the conduction path of an electric current flowing in a conductive liquid extends to great distances from the electrodes carrying the current into and out of the liquid. However, for all practical purposes, the greater part of the current (say 99.5%) is carried within a liquid space which is finite around the electrodes of the cell. Laboratory tests have shown that the influence of materials other than the conducting fluid upon current flowing between electrodes placed in a conducting liquid is virtually nil if these other materials are kept approximately the distance of the electrode spacing from the electrodes.

This principle has been used in the design of the cells of this invention. Thus in these embodiments of the invention, the filter screen and the outside rigid casing have been made of electrically non-conducting materials. Further, because a relatively large distance exists between the surfaces of the electrodes and the screen and casing surfaces, these parts have very little effect upon the cell's behavior. In other words, were the electrodes and cast resin block to be stripped of the screen and casing and placed in a conducting liquid, far from the walls of any container, the reading of the cell would be less than 0.5% different than the reading obtained by the complete cell.

This characteristic is of prime importance when the cell is buried in liquid-containing sand, for instance. Tests showed that the size, shape, packing, or other characteristics of the sand had no influence on the cell reading. Virtually the only influence on the cell reading (all other electrical factors being equal) was the electrical conductivity of the liquid entrained in the sand sample. This characteristic is also of importance if the cell is to be used in a metallic pipe well whose walls are in close proximity to the cell. In this case, also, the effect of any external material or body will not influence the cell reading significantly.

The plurality of holes in the casing permits free flow of water or other fluid entrained in the sand or earth around the cell to circulate freely in and out of the cell. The screen prevents particles of sand from entering the cell and interfering with the electrical characteristics of the electrodes. The closest elements to the exposed surfaces of the electrodes are the screen and the casing. These have deliberately been placed relatively far away from the electrode surfaces. Due to this fact the existence of other bodies outside the casing such as the metallic wall of a well pipe, closely packed sand, earth, or other bodies, will not affect the electrical characteristics of the cell to any appreciable degree. The solid block of resin into which the electrodes and wiring have been cast protects them from corrosion, and fixes the electrodes mechanically.

Thus, it is possible to bury the cell of the invention underground for long periods of time, and it will be unaffected by changes in sand packing, earth physical composition, and the presence of metallic or other foreign bodies. It will operate underground under severe environmental conditions and will respond only to the electrical conductivity of the water or other fluid flowing through its openings and screen.

In the claims the term "casing volume" is intended to means that volume defined by the inner walls of the casing.

What is claimed is:

1. A cell for determining conductivity of liquids comprising a substantially thin-walled casing of non-conductive materials, said casing defining a casing volume, a block of resinous, insulating material in said volume and filling a portion thereof, said block having a face, a cable extending into said casing and said block, at least one pair of spaced electrodes embedded in said block with the surface of said electrodes exposed at said face only, space between said face and an opposite wall of said casing, means for allowing access of liquid into said space, a liquid permeable screening means associated with said casing, the surfaces of said electrodes being spaced from said casing and said screening means by a distance at least about equal to the distance between said electrodes, said casing having two ends, said block extending from one of said ends to the other of said ends, said electrodes being in alignment, said block occupying at least about one-half of said casing volume, said means for allowing access of liquid constituting at least one opening in said casing.

2. A cell according to claim 1, wherein there are two sets of said electrodes, each of said sets being in alignment, and a cable for each set.

3. A cell according to claim 1, wherein said screening means is a screen in said space permitting passage of liquid therethrough.

4. A cell according to claim 1, wherein said face is substantially flat.

References Cited

UNITED STATES PATENTS

| | | | |
|---|---|---|---|
| 1,807,821 | 6/1931 | Behr | 324—30 |
| 2,083,074 | 6/1937 | Maass | 324—30 |
| 2,122,363 | 6/1938 | Christie | 324—30 |
| 2,636,962 | 4/1953 | Bouyoucos | 324—65 X |
| 2,922,103 | 1/1960 | Smith | 324—10 X |
| 3,028,546 | 4/1962 | Sproule | 324—30 |

RUDOLPH V. ROLINEC, *Primary Examiner.*

C. F. ROBERTS, *Assistant Examiner.*

UNITED STATES PATENT OFFICE

CERTIFICATE OF CORRECTION

Patent No. 3,376,501                April 2, 1968

Anthony Peranio

It is certified that error appears in the above identified patent and that said Letters Patent are hereby corrected as shown below:

In the heading to the printed specification, lines 4 and 5, for "Anthony Peranio, Haifa, Israel, assignor to Varian Associates, Palo Alto, Calif., a corporation of California" read -- Anthony Peranio, 18 Ruth Street, Haifa, Israel --.

Signed and sealed this 8th day of July 1969.

(SEAL)
Attest:

Edward M. Fletcher, Jr.           WILLIAM E. SCHUYLER, JR.

Attesting Officer                    Commissioner of Patents